UNITED STATES PATENT OFFICE.

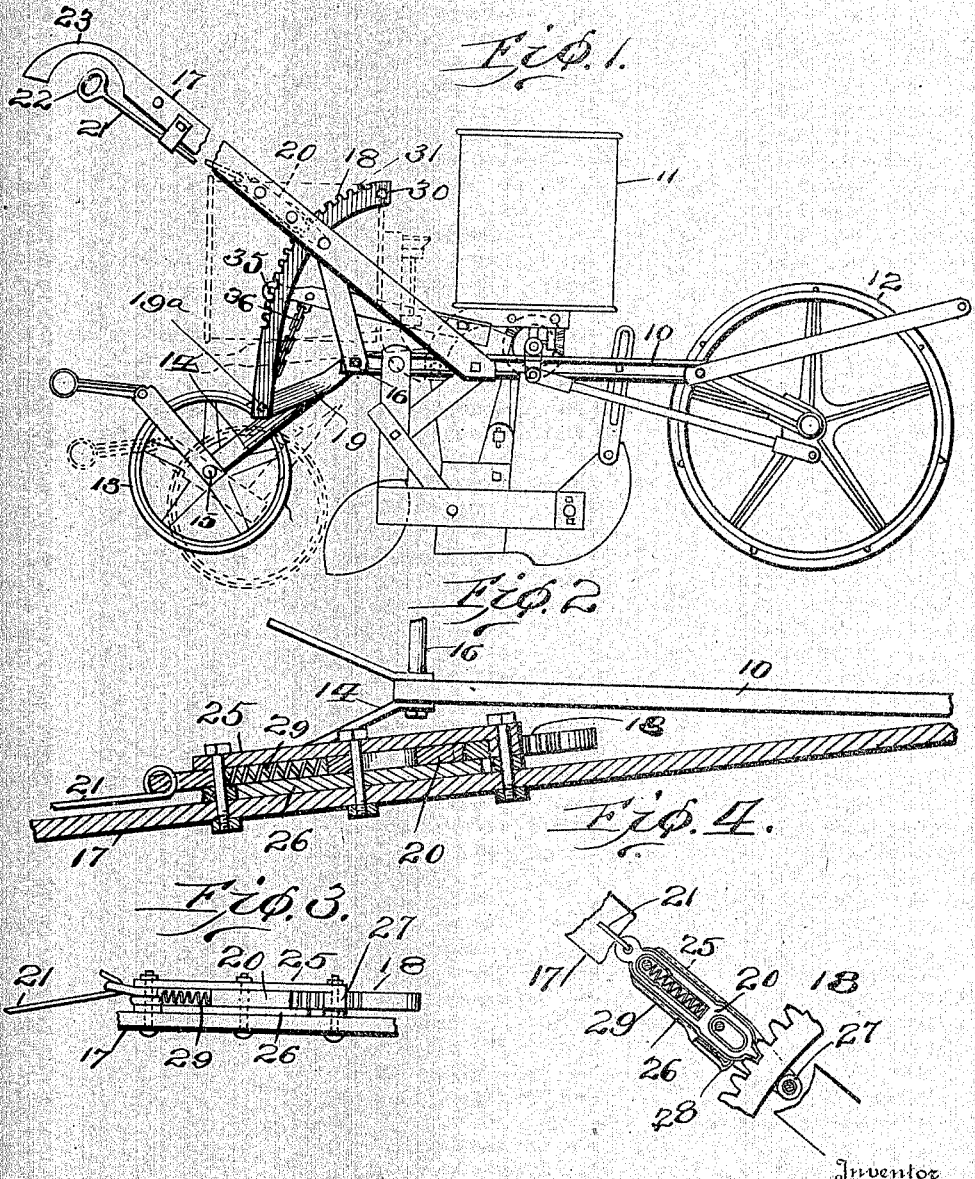

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER OR THE LIKE.

1,171,886.     Specification of Letters Patent.     Patented Feb. 15, 1916.

Original application filed February 25, 1911, Serial No. 610,722. Divided and this application filed April 28, 1914. Serial No. 835,009.

*To all whom it may concern:*

Be it known that I, CHARLES T. RAY, a citizen of the United States, residing at Louisville, in the county of Jefferson and State of Kentucky, have invented new and useful Improvements in Planters or the like, of which the following is a specification.

This invention has relation to farm implements and particularly to an improved means for regulating the height of the frame with reference to the ground: the most important purpose of the invention being to provide a farm implement—such as a walking planter, for example—with a supporting means which may be most readily and easily adjusted to, and effectively held in various selected positions to regulate the depth of operation of the implement, or for transporting purposes." This object, and others which will hereafter appear, are best secured from the construction illustrated in the accompanying drawings, in which—

Figure 1 is a side elevation of a walking planter embodying the present improvements. Fig. 2 is a longitudinal section taken through a portion of a certain handle, hereinafter referred to and showing the means for locking the carrier at different heights, also in section. Fig. 3 is a detail view of the same portion of the device looking downward at right angles to the handle. Fig. 4 is a detail view showing a portion of the locking means in its correlation with the handle, the view being taken from the inside and part of the handle being broken away.

The present invention is preferably though not essentially employed as a part of a walking hand planter. It is herein exemplified as comprising a frame 10 provided with a seed hopper 11 pivotally mounted on the frame. The front carrying wheel 12 serves the purposes of a traction wheel being connected with the seed dropping mechanism so as to operate the same. The construction of the frame and seed dropping mechanism are not essential to the present invention and for this reason and for the further reason that these parts are shown and described in detail in my co-pending application No. 610,722, filed Feb. 25, 1911, of which the present case is a division. I do not consider it to be necessary particularly to illustrate or describe the same herein.

The frame 10 carries suitable ground treating means, which need not be particularly herein set forth as a particular construction or character thereof forms no essential part of the present invention. Moreover, the particular ground treating means which I have herein illustrated and which I prefer to employ are shown and described in my application No. 663,133 which was filed Nov. 29, 1911, as a division of my before mentioned application No. 610,722.

As already stated the present invention particularly relates to means for adjusting the height of the frame 10 with reference to the ground, and the securing of the same in its various selected positions of adjustment: in order thereby to regulate the depth of operation of the ground treating means, for example. To this end the frame is supported at the front end by the wheel 12, hereinbefore referred to, and at its rear end by an additional wheel 13, the latter wheel being adjustable and provided with means correlated therewith to hold it in various selected positions. In the herein exemplified form of the invention the wheel 13 serves as a press wheel as well as to support the rear end of the frame at all times. The means whereby the wheel 13 is adjustably mounted and held constitute the present invention and will now be described, but it should be understood that while I shall describe said means in detail, changes may be made in the details set forth, without departing from the spirit of the invention or the scope of the subjoined claims, the form of the invention herein selected for exemplification being merely the preferred form of the invention.

The rear wheel 13 is supported by a carrier one of whose members is marked 14, it being understood that there is a like member on the other side of the wheel. The lower ends of the members 14 of the carrier are connected to the wheel, the latter preferably having an axle journaled therein, as shown at 15. The upper end of the carrier is pivotally connected to the frame 10, preferably near the rear end of the frame. It is preferred in practice to pivotally mount the upper end of the carrier on a fixed shaft 16.

17 designates a handle which is suitably connected to one side of the frame near the rear end of the latter, there being, preferably, in practice, a like handle (not shown)

secured to the other side of the frame. These handles are employed in guiding the implement and in raising its rear end from the ground; and it will be noted that when the rear end of the implement is raised its front end will be supported by the wheel 12 and will turn pivotally around the axis of said wheel as a fulcrum.

The carrier of the rear wheel is normally inclined rearward and the center of gravity of the carrier and rear wheel is so disposed that when the rear end of the frame is raised the carrier moves pivotally with reference to the frame so that it assumes a more nearly vertical position, wherein it may support the rear end of the frame at a higher elevation than before. Similarly, by pressing down on the handles, force is imposed on the carrier from the ground and through the rear wheel, causing it to incline more and correspondingly lower the rear end of the frame.

In order that the rear wheel may be locked in its various selected positions of adjustment, I have provided a locking mechanism which has the further important characteristic of being so arranged that the user may release the locking mechanism and raise or lower the frame at the same time.

The locking mechanism referred to comprises relatively movable interengaging members one of which is movable with the carrier and the other of which is carried by a handle of the implement, the latter member having an actuating element adjacent to the grip portion of said handle. The illustrated means comprises an arcual rack 18 which moves with the carrier, being here shown as pivoted at 19ᵃ to the lower end of an arm 19 which is suitably connected to the adjacent member 14 of the carrier; and a latch 20 which as carried by the handle 17 and is provided with an actuating rod 21 having a grip portion 22 adjacent to the grip portion 23 of the handle, the grip being so curved as preferably to present a portion at an angle to the length of the handle. This particular arrangement of parts has important advantages for which reason it is greatly preferred, but is not altogether essential to the invention, when the latter is considered in broad aspects defined by certain of the subjoined claims.

The toothed portion of the rack, in the arrangement herein illustrated, moves adjacent and relatively to the handle 17 and the latter is provided with a retainer for the latch and a guide for the rack. The herein illustrated retainer and guide comprises plates 25 and 26, between which the latch is slidably mounted and one of which is provided with projections 27 and 28 which are spaced apart to receive the rack bar between them and to hold said bar in position to be engaged by the latch. The latch is provided with a spring 29, for pressing it into engagement with the adjacent tooth of the rack bar after adjustment. A projection 30 from the upper end of the rack bar serves as a stop to prevent the bar from falling from the handle when the latter has been lifted to an extreme height.

It will thus be seen that I have provided a simple and practicable construction and correlation of parts by which the operator may simultaneously withdraw the latch from engagement with the rack bar and raise or lower the frame pivotally from its forward end, the front wheel supporting the frame during the adjustment, and that when the operator raises the rear end of the frame the wheel carrier is caused to move to a more nearly vertical position, in which it is locked by the automatic reëngagement of the latch with the rack bar when the operator releases the latch, thereby maintaining the frame in its new position for shallower planting than before; and similarly that when the operator presses downward upon the handles, after releasing the rack bar, the pressure of the ground, transmitted to the wheel carrier, through the rear wheel, causes the carrier to assume a position at a greater inclination than before, and thus lowers the frame for deeper planting, the parts being locked as before described when the frame has been lowered the desired extent. The adjustment and locking of the planter for different predetermined selected depths is thereby greatly facilitated and effectively secured by a simple and practicable mechanism. Moreover, by raising the frame and engaging the latch in the end notch 31 of the rack bar, for example, the ground treating elements will be sufficiently elevated to be clear of the ground, which is of great convenience in transporting the planter from and to its place of work, as the planter will then travel on its front and rear wheels without being interfered with by the ground treating means.

The hopper 11 is preferably pivoted to the frame, the pivoting means preferred being those forming the subject of my application No. 663,130 which was filed November 29, 1911 as a division of my application No. 610,722. The seed dropping mechanism preferred is of a character which embraces elements which are disengaged from each other by tilting the hopper and when so disengaged cause the flow of seed to stop, the stoppage of the flow of seed being important when the implement is being moved to and from its work, for example. This part of the mechanism is not herein claimed and need not be particularly set forth herein, as it forms no essential part of the present invention and is fully illustrated in my applications Numbers 610,722 and 663,130 hereinbefore referred to. Reference however may be made to a handle 35 which is suitably connected to the hopper and projects therefrom and to the flexible connector 36 which connects said handle to the arm 19, whereby the seed hopper may be turned manually by the operator grasping the handle, and will be adjusted automatically when the frame has been raised to a predetermined position—the transport position for example—as clearly set forth and claimed in my application No. 610,722 hereinbefore referred to.

Having now described my invention what I believe to be new and desire to secure by Letters Patent, is:—

1. In an implement of the kind set forth, a frame having a handle provided with a hand grip, supporting wheels for opposite ends of the frame, one of said supporting wheels having a carrier which is pivotally connected to the frame and supports the adjacent end of the frame from the wheel at different selected heights, said carrier being arranged to adjust itself automatically with relation to the frame when downward pressure is imposed on the handle or the handle is raised to raise or lower the frame, and means for locking the carrier in its different selected positions, comprising interengaging elements one of which is movable with the carrier and the other of which is carried by the handle and has an actuating element adjacent to the hand grip.

2. In an implement of the kind set forth, a frame having a handle provided with a hand-grip, supporting wheels for opposite ends of the frame, a carrier for one of the supporting wheels, said carrier having its upper end pivotally connected to the frame and being adjustable to different angles with relation thereto, said carrier being arranged to adjust itself automatically with relation to the frame when downward pressure is imposed on the handle or the handle is raised to lower or raise the frame, and a rack and latch mechanism for locking the carrier in different selected positions of adjustment, one member of said mechanism being connected to the carrier and the other being carried by the handle and adjustable longitudinally thereof and having its adjusting element adjacent to the hand-grip.

3. In an implement of the kind set forth, a frame having a handle provided with a hand-grip, supporting wheels for opposite ends of the frame, a carrier for one of the supporting wheels, said carrier having its upper end pivotally connected to the frame and being adjustable to different angles with relation thereto, said carrier being arranged to adjust itself automatically with relation to the frame when downward pressure is imposed on the handle or the handle is raised to lower or raise the frame, and a rack and latch mechanism for locking the carrier in different selected positions of adjustment, one member of said mechanism being connected to the carrier and the other being carried by the handle and adjustable longitudinally thereof and having its adjusting element adjacent to the hand-grip, the hand-grip being provided with a portion at an angle to the length of the handle and the adjusting element being provided with a finger grip closely adjacent the angled portion of the hand-grip.

4. In an implement of the kind set forth, a frame having a handle at one end, supporting wheels for opposite ends of the frame, a carrier for one of the supporting wheels, said carrier having its upper end pivotally connected to the frame and being adjustable to different angles with relation thereto and supporting the frame at different heights from said wheel, a pivoted rack having connection with the carrier, guiding means for said rack, arranged on the handle, and a latch carried by the handle for engaging the rack.

5. In an implement of the kind set forth, a frame having a handle at one end, supporting wheels for opposite ends of the frame, a carrier for one of the supporting wheels, said carrier having its upper end pivotally connected to the frame and being adjustable to different angles with relation thereto and supporting the frame at different heights from said wheel, a pivoted rack having connection with the carrier, guiding means for said rack, arranged on the handle, a spring pressed latch carried by the handle for engaging the rack, and means adjacent to the grip portion of the handle for adjusting the latch in opposition to the spring.

6. In an implement of the kind set forth, a frame, supporting wheels for opposite ends of the frame, a handle at one end of the frame, a carrier for the wheel at the handle-end of the frame, said carrier having its upper end pivoted to the frame and being arranged to turn when the adjacent end of the frame is raised, and means for locking said carrier in various selected positions of adjustment, said means comprising relatively movable members adapted to be engaged with and released from each other, one of said members having an element for adjusting it, arranged so that it can be operated at the same time the frame is to be raised or lowered by raising or pressing down upon the handle.

7. In an implement of the kind set forth, a frame, supporting wheels for opposite ends of the frame, a handle at one end of the frame, a carrier for the wheel at the handle-end of the frame, said carrier having its upper end pivoted to the frame and being arranged to turn when the adjacent end of the frame is raised, and means for locking said carrier in various selected positions of adjustment, said means comprising a pivoted rack, movable with the carrier, a guide for said rack, carried by the handle, a latch to engage said rack, also carried by the handle, and an actuating element for the latch, arranged adjacent to the grip portion of the handle.

8. In an implement of the kind set forth, a frame having a handle, a carrier pivotally connected to the rear end of the frame and projecting downward therefrom, a supporting wheel journaled upon the carrier, an arm movable with the carrier, a rack pivoted to the arm and projecting upward therefrom and movable with relation to the handle when the frame is lifted, and a latch carried by the handle and adapted to engage said rack.

9. In an implement of the kind set forth, a frame having a handle, a carrier pivotally connected to the rear end of the frame and projecting downward therefrom, a supporting wheel journaled upon the carrier, an arm movable with the carrier, a rack pivoted to the arm and projecting upward therefrom and movable with relation to the handle when the frame is lifted, and a latch carried by the handle and adapted to engage said rack, said latch having an actuating element adjacent to the grip portion of the handle.

10. In an implement of the kind set forth, a frame having a handle, a carrier pivotally connected to the frame and projecting downward therefrom, a supporting wheel journaled upon the carrier, a pivotally supported rack, a latch coöperating with said rack to lock the carrier in different selected positions of adjustment, and means adjacent to the handle for adjusting the latch.

11. In an implement of the kind set forth, a frame having a handle, a carrier pivotally connected to the frame and projecting downward therefrom, a supporting wheel journaled upon the carrier, a pivotally supported rack, guiding or retaining means therefor, carried by the handle, and a latch carried by the handle and adapted to engage the rack.

12. In an implement of the kind set forth, a frame having a handle, a carrier pivotally connected to the frame and projecting downward therefrom, a supporting wheel journaled upon the carrier, a pivotally supported rack, guiding or retaining means therefor, carried by the handle, and a latch arranged to engage the rack, and having an adjusting element adjacent to the grip portion of the handle.

13. In an implement of the kind set forth, a frame having a handle, a carrier pivotally connected to the frame and projecting downward therefrom, a supporting wheel journaled upon the carrier, a pivotally supported rack, a spring-pressed latch carried by the handle and coöperating with said rack to lock the carrier in different selected positions of adjustment, a retaining means for said latch, carried by the handle and arranged to guide the rack, said rack being mounted to slide through the retaining means, and a rod arranged to adjust the latch in opposition to the spring, said rod having a grip portion adjacent to the grip portion of the handle.

In testimony whereof I have hereunto set my hand in presence of two subscribing witnesses.

CHARLES T. RAY.

Witnesses:
J. K. SCOGGAN,
W. M. JOHNSTON.